Aug. 28, 1962   C. J. ZONE   3,051,036
SKY SCANNING DEVICE
Filed Nov. 25, 1960
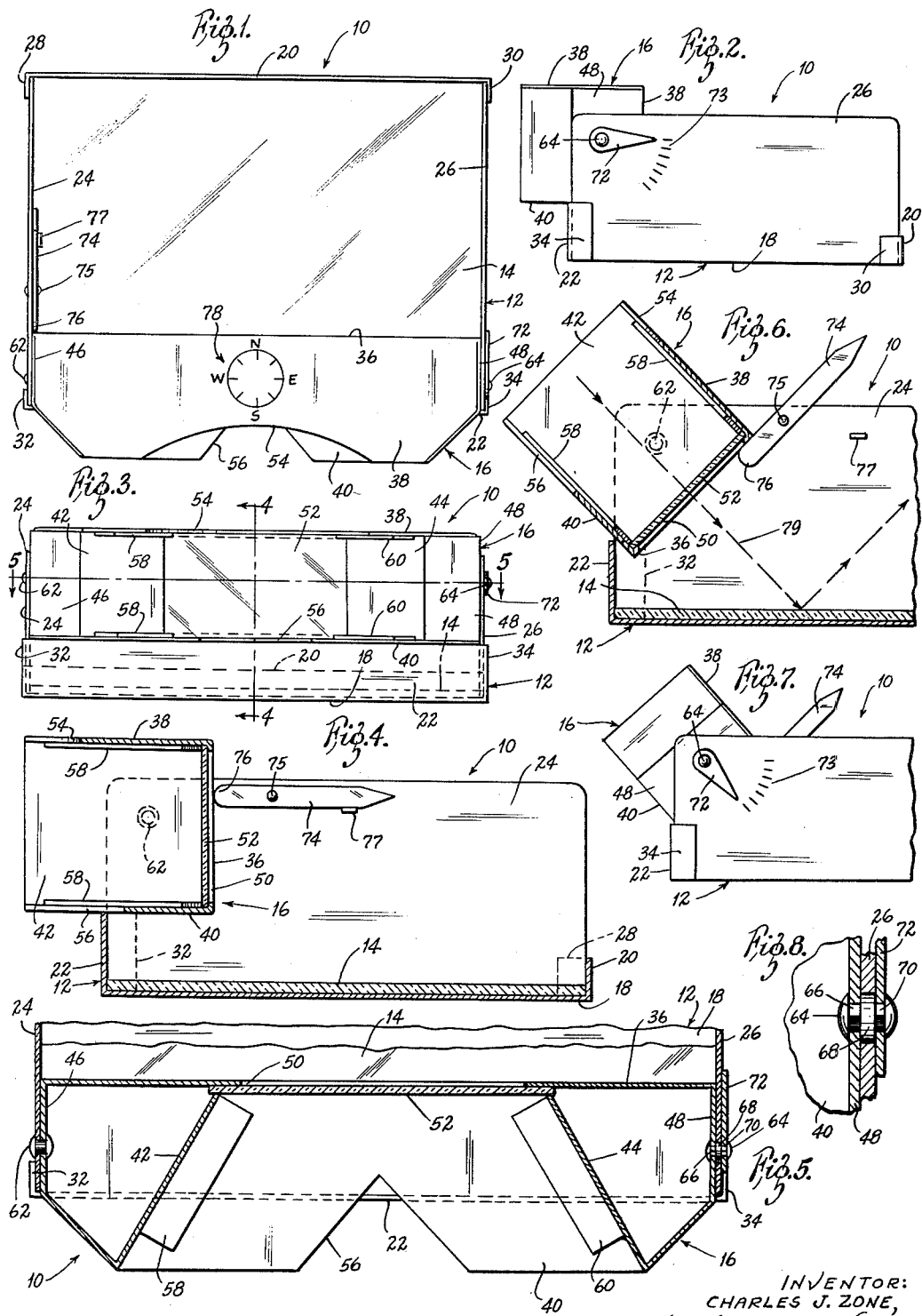
INVENTOR:
CHARLES J. ZONE,
BY Kingsland, Rogers & Ezell
ATTORNEYS 3,051,036
SKY SCANNING DEVICE
Charles J. Zone, 2417 Macklind Ave., St. Louis 10, Mo.
Filed Nov. 25, 1960, Ser. No. 71,682
5 Claims. (Cl. 88—1)

This invention relates to improvements in viewers, and, in particular, is concerned with a sky scanning device that can be very simply used and adjusted.

The study of astronomy and the study of various objects in the sky is one that is followed by a very wide variety of individuals. Lately, this study has become very popular with large masses of people who study not only the stars and other terrestrial bodies, but the passage in flight through the sky of the various earth satellites. During the daytime the observation of movement of the sun through various eclipses has also been quite popular with a large number of people. Other objects viewed include aircraft and, in fact, almost anything that is found in the sky.

It has been a particular problem in the past with a large number of people to make a prolonged study of an object in the sky due to the physical discomfort in craning the neck upwardly to look at a position high in the sky. By means of this invention there has been provided a very simply constructed and operated sky scanning device. This sky scanning device removes the necessity of craning the neck upwardly and permits the viewer to look in a normal manner by holding his head in a normal position to direct the eyesight through the sky scanning device with the line of sight being reflected upwardly to the sky. In this manner no craning of the neck is required and the viewer can scan fully the entire visible portion of the heavens.

The sky scanning device of this invention comprises as its main component a flat mirror with a viewing member pivotally supported above the mirror. The viewing member is so designed that it fits closely over the brow and around the temples of the viewer to shut out undesirable and interfering light. The viewing member may be tilted so that a full scanning operation may be enjoyed of objects low on horizon or high upon the horizon. Normally, the mirror is held in a substantially horizontal position, but where objects to be viewed are directly overhead the mirror may be slightly tilted to enable such objects to be viewed.

The sky scanning device may be very simply made out of cardboard or other rigid materials of construction. The structure is such that the orientation of the tilt of the viewing member and the geographical position may be readily observed. Thus, a pointer upon the tiltable viewing member is provided to provide ready reference to the setting so that the same viewing position may be obtained by another individual. Likewise, compass markings are provided to provide geographical, i.e. compass, orientation.

It is accordingly a primary object of this invention to provide a sky scanning device comprising a mirror supported upon a flat base and a tiltable viewing member supported over the mirror.

Another object of this invention is to provide a sky scanning device having a flat mirror and a tiltable viewing member having indicating means registering the degree of tilt.

Yet another object of this invention is to provide a sky scanning device having a flat mirror and a tiltable viewing member with means for removably receiving a filter element.

Still another object of this invention is to provide a sky scanning device having a flat mirror and a tiltable member in which the viewing member is particularly constructed to fit closely over the brow and adjacent the temples and the nose of a viewer to cut out undesirable light.

Yet a further object of this invention is to provide a sky scanning device having a base structure holding a flat mirror therein and a tiltable viewing member in which the device can be made of cardboard formed from blanks or the like in a strong and rugged manner and in which the device can be simply operated by a viewer with no required specialized training.

Further objects of this invention will appear in the detailed description which follows and will be otherwise apparent to those skilled in the art.

For the purpose of illustration of this invention there is shown in the accompanying drawings a preferred embodiment. It is to be understood that these drawings are for the purpose of illustration only and that the invention is not limited thereto.

In the drawings:
FIGURE 1 is a top plan view of the sky scanning device;
FIGURE 2 is a view in side elevation of the sky scanning device taken from the right side of FIGURE 1;
FIGURE 3 is a view in rear elevation of the device;
FIGURE 4 is a view in section taken on the line 4—4 of FIGURE 3 showing the construction of the viewing member and its orientation with the base of the device;
FIGURE 5 is a view in section taken on the line 5—5 of FIGURE 3 showing further details of construction of the viewing member;
FIGURE 6 is a view in section taken similarly to FIGURE 4, but showing only the rear of the device and also showing a relatively tilted position for the viewing member;
FIGURE 7 is a fragmentary view in side elevation of the device taken similarly to FIGURE 2 and showing a relatively tilted position of the viewing member; and
FIGURE 8 is an enlarged fragmentary view in section showing the bearing construction for attachment of the viewing member to the sky scanning device with the indicating pointer.

The sky scanning device of this invention is generally indicated by the reference numeral 10 in FIGURE 1. As there shown, and as shown in FIGURES 2 through 7, it includes as its major components a supporting base generally indicated by the reference numeral 12, a flat mirror 14, and a viewing member 16.

The structure of the supporting base 12 is best shown in FIGURES 1, 2 and 4. As there shown, the base is made of cardboard or other similar material of construction. The base is composed of a flat bottom 18 from which extend a front wall 20, a rear wall 22, and side walls 24 and 26. The front wall 20 is of just sufficient height to enclose and form a supporting rim for the mirror 14. The front wall is provided also with tabs 28 and 30, which may be adhesively secured or otherwise secured to the side walls 24 and 26, respectively. In like manner the rear wall 22 is provided with tabs 32 and 34, which are adhesively secured to the rearward portion of the side walls 24 and 26. By the above noted construction the supporting base 12 can be conveniently made out of a single blank of material.

The viewing member 16 may also be simply made out of a single blank of material such as cardboard or other rigid or semi-rigid material of construction, such as plastic or the like. As shown in FIGURES 1, 4 and 5, the viewing member is comprised of a front wall 36, top wall 38, bottom wall 40, inner side walls 42 and 44, and outer side walls 46 and 48. The front wall 36 is provided with an opening 50, which receives a filter element in the form of smoked glass or other special type of filter glass identified by the reference numeral 52.

In the construction of the viewing member 16, it will be particularly noted that the top wall 38 is provided with an arcuate recess 54, which is adapted to fit closely over the brow of a viewer. The bottom wall 40 of the viewing member is likewise provided with a recess 56, which is of a wedge-shaped configuration and closely receives the nose of a viewer. The inner side walls 42 and 44 converge forwardly and are spaced apart a distance at the rear which closely conforms to the temple spacing of the average viewer. Lastly, it will be noted that the inner side wall 42 is provided with upper and lower tabs 58, while the inner side wall 44 is provided with upper and lower tabs 60, which are adapted to be adhesively secured to the top wall 38 and the bottom wall 40. This provides a rigid box-like structure that is quite strong and durable.

The viewing member 16 is very simply mounted to the side walls 24 and 26 of the supporting base. This mounting is best shown in the sectional view of FIGURE 5. As shown therein, the viewing member is attached at the left side to the left side wall 24 by a pivot pin 62. This may be of a cylindrical shaft construction to provide for ready rotation. The structure of the pivot bearing at the right side is somewhat different as it is desired to provide a keyed pointer attached to the pivot pin. This construction is also shown in FIGURE 5 and more particularly shown in FIGURE 8. In this construction a pin 64 is employed which has a shaft of three sections. The first section 66 has a square cross section, while the second or medial section has a cylindrical cross section 68. The third section 70 of the shaft has a square cross section also. As shown in FIGURE 8 the pin fits through mating openings in the outer right side wall 48 of the viewing member and the right side wall 24 of the supporting base and is connected to a tilt indicating pointer 72. This construction, in effect, keys the right side wall 48 of the viewing member to the tilt indicating pointer 72 as these two members are in turn keyed to the pin. Since the supporting base has the right side wall 26 provided with a cylindrical opening, the cylindrical portion 68 of the pin freely rotates therein so that the viewing member may be tilted to any desired degree.

The tilt indicating pointer 72 is further shown in FIGURES 2 and 7. As there shown, it is adapted to point to a series of markings 73. These markings provide a ready reference source and orientation for the degree of tilt.

A line of sight pointer 74 is also provided by an eccentric pivotal connection 75 upon the side wall 24. It is movable by engagement of its rounded rear end 76 with the front wall 36 of the viewing member. A stop 77 prevents it from falling away from the horizontal position of FIGURE 4.

There is further provided an orientation marking to provide for geographical orientation of the scanning device. Thus, as shown in FIGURE 1 a compass marking, generally indicated by the reference numeral 78, is provided upon the top wall 38 of the viewing member. This compass marking, instead of being marked in terms of direction, such as north, east, south and west, may also, as will be readily understood, be marked with the degrees of the compass passing from zero through 360°. Thus, any type of system may be used to provide a directional azimuth.

Use

The use of the sky scanning device of this invention is very simple. On normal employment the viewing member is turned to the position indicated in FIGURES 6 and 7. Then the individual places his head against the viewing member in the obvious fashion and looks through the viewing member along the line of sight generally indicated by the dotted line 79. When it is desired to view a star or other object in the sky at a lower point more adjacent the horizon, the viewing member is tilted somewhat counterclockwise to the position shown in FIGURES 6 and 7. Obviously, in this manner the line of sight will be reflected to a lower position in the sky and the line of sight indicating pointer 74 will make this indication.

When a group of people are together, the sky scanning device may be handed back and forth. To provide for ready reference and also to provide a record of the orientation of the sky scanning device, the pointer 72 may be utilized. The markings 73 may be numbered or lettered or provided with other obvious means of identification so that the position of the pointer can be properly identified. Likewise the sky scanning device can be properly geographically oriented by reference to the compass markings 78. This is done in obvious fashion by orienting a known object in the sky, such as the planet Saturn so that it is lined up in the north direction or the east direction to provide a line of reference, depending upon which geographical portion of the sky is desired to be scanned.

The structure of the sky scanning device has been made of a very simple nature. This essentially is accomplished by the use of the single blank of cardboard in the structure of each of the supporting base and the viewing member. The mirror 14 has an extensive surface also so that the viewer may tilt the viewing member and scan a very substantial portion of the sky. Further, by provision of the particular structure of the viewing member, and also through the rather substantially sized side walls, interfering light is cut down to a minimum. Accordingly, it will be apparent that there has been provided a very simply yet ruggedly constructed sky scanning device which can be simply used in a very efficient and advantageous manner.

Various changes and modifications may be made within this invention as will be readily apparent by those skilled in the art. Such changes and modifications are within the scope and teaching of this invention as defined by the claims appended hereto.

What is claimed is:

1. A hand operated sky scanning device for viewing objects in the sky comprising a flat base supportable horizontally upon the hand of a viewing individual, a mirror horizontally supported by said base, a pair of side walls extending upwardly from said base and a viewing member pivotally supported by said side walls, such that the line of sight of the viewing member may be angularly adjusted with respect to said mirror, said viewing member having a rear opening fitting over the eyes of an individual viewer and a front opening adjacent said mirror, said viewing member being comprised of a top wall, a bottom wall and a pair of side walls, said walls extending between the side walls of said base and being in movable contact therewith, said walls defining a rear opening fitting over the eyes of a viewer and a front opening looking at said mirror.

2. A hand operated sky scanning device for viewing objects in the sky comprising a flat base supportable horizontally upon the hand of a viewing individual, a mirror horizontally supported by said base, a pair of side walls extending upwardly from said base and a viewing member pivotally supported by said side walls, such that the line of sight of the viewing member may be angularly adjusted with respect to said mirror, said viewing member having a rear opening fitting over the eyes of an individual viewer and a front opening looking onto said mirror, said viewing member being comprised of a top wall, said walls extending between the side walls of said base and being in movable contact therewith, a bottom wall and a pair of side walls, said top wall having an arcuate recessed rear edge closely fitting over a viewer's brow, said bottom wall having a rear edge provided with a wedge-shaped opening closely fitting over a viewer's nose and both of said side walls having opposed rear edges fitting closely to the viewer's temples and converging from said rear edges to the front, said walls defining a rear opening fitting over the eyes of a viewer and a front opening adjacent said mirror and said viewing member being provided with a pair of inwardly extending tabs removably receiving a filter element.

3. A hand operated sky scanning device for viewing objects in the sky comprising a flat base supportable horizontally upon the hand of a viewing individual, a mirror horizontally supported by said base, a pair of side walls extending upwardly from said base and a viewing member pivotally supported by said side walls, such that the line of sight of the viewing member may be angularly adjusted with respect to said mirror, said viewing member having a rear opening fitting over the eyes of an individual viewer and a front opening looking onto said mirror, said viewing member being comprised of a top wall, a bottom wall and a pair of side walls, said top wall having an arcuate recessed rear edge closely fitting over a viewer's brow, said bottom wall having a rear edge provided with a wedge-shaped opening closely fitting over a viewer's nose and both of said side walls having opposed rear edges fitting closely to the viewer's temples and converging from said rear edges to the front, said walls defining a rear opening fitting over the eyes of a viewer and a front opening adjacent said mirror, said viewing member being further provided with a sky viewing orienting device comprising compass markings on a top wall of the viewing member.

4. A hand operated sky scanning device for viewing objects in the sky comprising a flat base supportable horizontally upon the hand of a viewing individual, a mirror horizontally supported by said base, a pair of vertically extending side walls connected to said base, and a viewing member extending between the rear ends of said side walls, said viewing member being pivotally supported with respect to said side walls by a connecting pin such that the line of sight of the viewing member may be angularly adjusted with respect to said mirror, said viewing member being comprised of a top wall, a bottom wall and a pair of side walls, said walls defining a rear opening fitting over the eyes of a viewer and a front opening adjacent said mirror, and an indicating pointer for registering the degree of tilt of the viewing member, said indicating member being keyed to the connecting pin for synchronized rotation with said viewing member, said viewing member being further provided with a sky viewing orienting device comprising compass markings on a top wall of the viewing member.

5. A hand operated sky scanning device for viewing objects in the sky comprising a supporting base supportable horizontally upon the hand of a viewing individual, a mirror horizontally supported upon said base and a viewing member pivotally supported upon said supporting base such that the line of sight of the viewing member may be angularly adjusted with respect to said mirror, said supporting base being made from an integral cardboard blank and comprising a flat base, a pair of vertical side walls extending upwardly from said base, a front vertical wall and a rear vertical wall, said front and rear walls being secured to the side walls by tabs connected to said side walls to provide a rigid supporting base and said viewing member being made from an integral cardboard blank and said viewing member being comprised of a top wall, a bottom wall and a pair of side walls, said top wall having an arcuate recessed rear edge closely fitting over a viewer's brow, said bottom wall having a rear edge provided with a wedge-shaped opening closely fitting over a viewer's nose and both of said side walls having opposed rear edges fitting closely to the viewer's temples and converging from said rear edges to the front, said walls defining a rear opening fitting over the eyes of a viewer and a front opening adjacent said mirror, said side walls being provided with tabs secured to the top and bottom walls to provide a rigid viewing member.

References Cited in the file of this patent

UNITED STATES PATENTS

| | | |
|---|---|---|
| 163,946 | Ritchie | June 1, 1875 |
| 1,092,224 | Nesdall | Apr. 7, 1914 |
| 1,446,574 | McAdie | Feb. 27, 1923 |
| 2,232,032 | Kroner | Feb. 18, 1941 |
| 2,347,176 | Doner | Apr. 25, 1944 |
| 2,704,400 | Baldocchi | Mar. 22, 1955 |